United States Patent
Kondo

(10) Patent No.: US 10,081,075 B2
(45) Date of Patent: Sep. 25, 2018

(54) BEAM PROCESSOR

(75) Inventor: Kiyoyuki Kondo, Futyu (JP)

(73) Assignee: YUKI ENGINEERING SYSTEM CO. LTD., Tokyo (JP)

( * ) Notice: Subject to any disclaimer, the term of this patent is extended or adjusted under 35 U.S.C. 154(b) by 1161 days.

(21) Appl. No.: 13/977,969

(22) PCT Filed: Jan. 5, 2011

(86) PCT No.: PCT/JP2011/050022
§ 371 (c)(1),
(2), (4) Date: Jul. 2, 2013

(87) PCT Pub. No.: WO2012/093471
PCT Pub. Date: Jul. 12, 2012

(65) Prior Publication Data
US 2013/0270240 A1    Oct. 17, 2013

(51) Int. Cl.
*B23K 26/02*    (2014.01)
*B23K 26/00*    (2014.01)
(Continued)

(52) U.S. Cl.
CPC ...... *B23K 26/0006* (2013.01); *B23K 26/0066* (2013.01); *B23K 26/035* (2015.10);
(Continued)

(58) Field of Classification Search
CPC ............ B23K 2203/08; B23K 2203/50; B23K 26/0006; B23K 26/0066; B23K 26/026;
(Continued)

(56) References Cited

U.S. PATENT DOCUMENTS 4,315,130 A    2/1982  Inagaki et al.
5,784,155 A *  7/1998  Ohtomo ............... G01C 15/004
                                                    356/141.1
(Continued)

FOREIGN PATENT DOCUMENTS

CN    200967824 Y    10/2007
JP    A-59-18121      1/1984
(Continued)

OTHER PUBLICATIONS

A.G. Grigor'yants et al., "Tehnologicheskie protsessy lazernoy obrabotki," MSTU named after H.A. Bauman, 2006, p. 552, lines 5-20.
(Continued)

*Primary Examiner* — Dana Ross
*Assistant Examiner* — Joseph Iskra
(74) *Attorney, Agent, or Firm* — Oliff PLC

(57) ABSTRACT

A beam processor for processing a work surface of a workpiece W by irradiating the work surface with a beam, includes: an output source for outputting the beam, a beam moving device for moving the beam output from the output source; and a plurality of reflectors disposed on an optical path of the beam between the beam moving device and the work surface for reflecting the beam moved by the beam moving device and conducting the beam to the work surface, wherein the plurality of reflectors is inclined a predetermined angle corresponding to an incident direction of the beam so that the beam moved by the beam moving device is conducted nearly vertically to a different position of the work surface.

7 Claims, 17 Drawing Sheets

(51) Int. Cl.
*B23K 26/06* (2014.01)
*B23K 26/035* (2014.01)
*B23K 26/082* (2014.01)
B23K 103/00 (2006.01)
B23K 103/04 (2006.01)

(52) U.S. Cl.
CPC ........ *B23K 26/0643* (2013.01); *B23K 26/082* (2015.10); *B23K 2203/04* (2013.01); *B23K 2203/50* (2015.10); *B23K 2203/54* (2015.10)

(58) Field of Classification Search
CPC . B23K 26/035; B23K 26/0643; B23K 26/082
USPC ........ 219/50, 121.6, 121.11, 121.12, 121.61, 219/121.62, 121.63, 121.64, 121.65, 219/121.66, 121.67, 121.68, 121.69, 219/121.73, 121.74, 121.75, 121.78, 219/121.79
See application file for complete search history.

(56) References Cited

U.S. PATENT DOCUMENTS

| | | | |
|---|---|---|---|
| 6,078,420 A | 6/2000 | Macken | |
| 6,373,633 B1 | 4/2002 | Brown | |
| 6,872,910 B2* | 3/2005 | Tanaka | B23K 26/0604 219/121.6 |
| 7,078,650 B2* | 7/2006 | Gross | B23K 26/067 219/121.71 |
| 7,176,409 B2* | 2/2007 | Gross | B23K 26/067 219/121.73 |
| 2003/0021307 A1* | 1/2003 | Yamazaki | B23K 26/0604 372/24 |
| 2003/0080099 A1* | 5/2003 | Tanaka | B23K 26/0604 219/121.73 |
| 2003/0112322 A1* | 6/2003 | Tanaka | B23K 26/0604 347/241 |
| 2003/0146196 A1* | 8/2003 | Kurosawa | H05K 3/0032 219/121.72 |
| 2003/0168434 A1* | 9/2003 | Gross | B23K 26/0626 219/121.7 |
| 2007/0279611 A1* | 12/2007 | Baselmans | G03F 7/70583 355/67 |

FOREIGN PATENT DOCUMENTS

| | | |
|---|---|---|
| JP | U-4-98385 | 8/1992 |
| JP | A-2000-334594 | 12/2000 |
| JP | A-2002-519715 | 7/2002 |
| JP | A-2002-346775 | 12/2002 |
| JP | A-2004-20983 | 1/2004 |
| JP | A-2008-286865 | 11/2008 |
| JP | A-2010-142846 | 7/2010 |
| JP | A-2010-188396 | 9/2010 |
| RU | 2034687 C1 | 5/1995 |
| RU | 2132761 C1 | 7/1999 |
| RU | 2312745 C2 | 12/2007 |
| RU | 2371704 C1 | 10/2009 |
| RU | 2382693 C1 | 2/2010 |
| TW | 548155 B | 8/2003 |

OTHER PUBLICATIONS

International Search Report issued in International Patent Application No. PCT/JP2011/050022 dated Apr. 12, 2011.

* cited by examiner

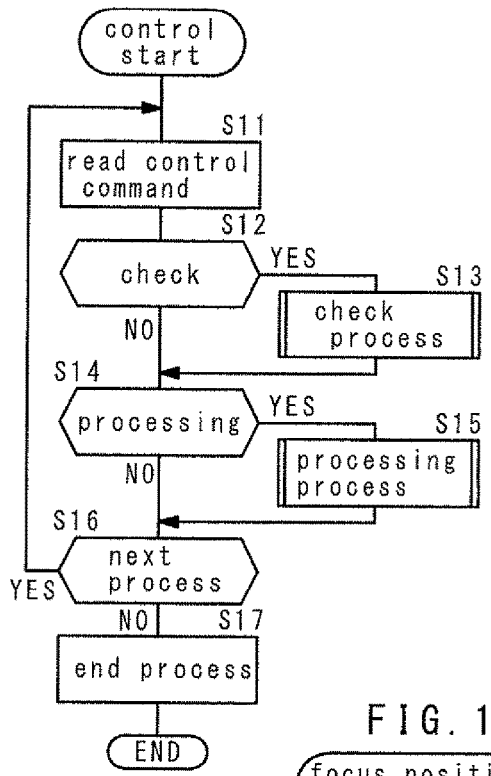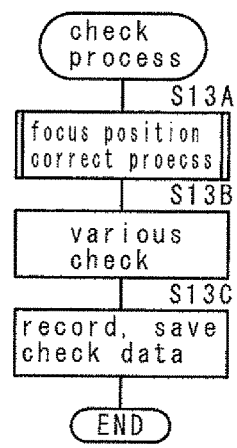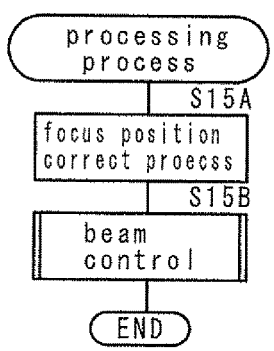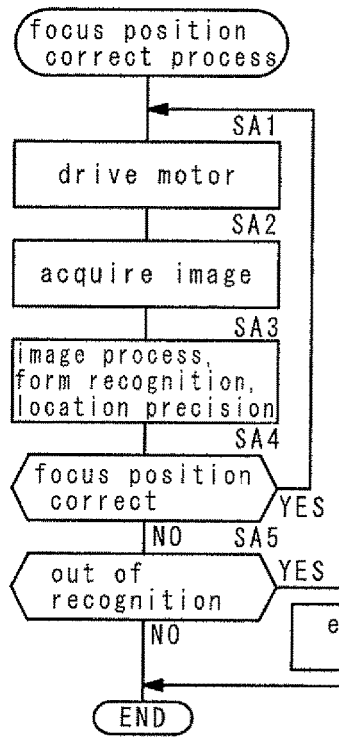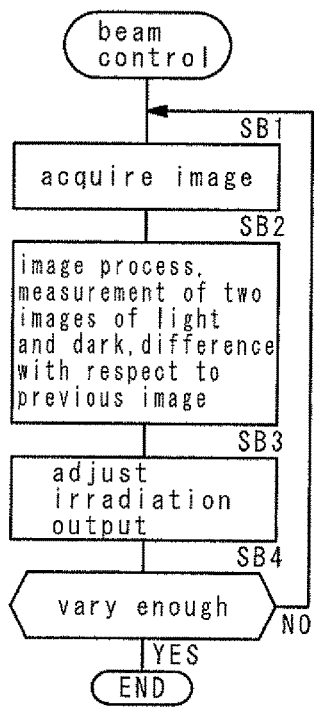

BEAM PROCESSOR

FIELD OF THE INVENTION

The present invention relates to a beam processor for processing a work surface of a workpiece by irradiating the work surface with a beam.

BACKGROUND OF THE ART

Laser beam processors for processing a workpiece with a laser beam such as laser markers for forming characters or the like on the workpiece, laser cutting machines for cutting the workpiece into a predetermined form, and laser welding machines for welding the workpiece are known. Various laser beam processors also have been developed; for example, laser soldering machines for soldering and glass sealing machines for binding or sealing a glass using a laser beam in solar cells or the like.

In these laser beam processors, two major methods described below are used to move a laser beam relative to the work surface of a workpiece.

For example, in the laser beam processor disclosed in Patent Reference 1, a laser beam is deflected in two directions using the two galvanometer mirrors and conducted to the work surface of a workpiece through an Fθ lens (this method is called "the deflecting method"). In Patent Reference 1, the laser beam can be focused on the work surface precisely by calculating the distance to the work surface by detecting the laser beam reflected on the work surface and by controlling the focus adjusting means disposed at the upstream of the galvanometer mirrors.

Also, in the laser beam processor disclosed in Patent Reference 2, the workpiece is disposed on the 3-degree-of-freedom stage that can move three-dimensionally and the laser beam is conducted to any position on the work surface by moving the stage relative to the laser beam (this method is called "the moving method"). In Patent Reference 2, the work surface can be precisely processed by moving the stage three-dimensionally and irradiating the work surface with the laser beam constantly vertically.

REFERENCE OF THE PRIOR ART

Patent References

Patent Reference 1: Japanese Patent Application Publication No. 2010-142846
Patent Reference 2: Japanese Patent Application Publication No. 2000-334594

DISCLOSURE OF THE INVENTION

Problems the Invention is Intended to Solve

However, the deflecting method cannot radiate the laser beam to the work surface vertically when the angle of the deflection is large because the laser beam is deflected in a sector centering the reflecting surfaces of the galvanometer mirrors. If the laser beam could not irradiate the work surface of the workpiece vertically, the work surface cannot be processed precisely because the beam spot form on the work surface is greatly deformed. Here, the Fθ lens located between the galvanometer mirrors and the work surface of the workpiece can focus the laser beam on the work surface and adjust the beam spot form to some extent. However, the adjustable area is typically limited to the extent of 100 mm to 300 mm depending on the size and capability of the Fθ lens. Therefore, it is not practical in terms of cost to adopt the Fθ lens, for which the size is fitted to the width of the factory line or the size of the workpiece. By contrast, using the long focus objective lens, the laser beam can be radiated to the wide area of the work surface of the workpiece nearly vertically. However, the laser beam processor becomes large. For example, when the area of the work surface is 300 mm, the laser beam needs to be deflected from the distance of 4500 mm, by a factor of about 15 of the radiating areas for deflecting the laser beam by an angle of ±4°. It is very difficult to control because the angle for moving the beam spot 1 mm on the work surface is about 0.0127°.

By contrast, in the moving method, it is difficult to move the stage fast in relation to the weight. Therefore, the moving method cannot process the work surface of the workpiece fast because this method cannot move the laser beam fast on the work surface of the workpiece in comparison with the deflecting method. Furthermore, this method not only needs a complicated mechanism but also has drawbacks of increasing energy consumption because this method needs to control the movement of the stage.

It is an object of the present invention to provide a beam processor which is able to process the work surface of the workpiece fast and precisely and is able to process the wide area of the work surface without a larger machine.

SUMMARY OF THE INVENTION

In accordance with an aspect of the present invention, a beam processor for processing a work surface of a workpiece by irradiating the work surface with a beam, comprising: an output source for outputting the beam; a beam moving means for moving the beam output from the output source; and a plurality of reflectors disposed on an optical path of the beam between the beam moving means and the work surface for reflecting the beam moved by the beam moving means and conducting the beam to the work surface, wherein the plurality of reflectors is inclined a predetermined angle corresponding to an incident direction of the beam so that the beam moved by the beam moving means is conducted nearly vertically to a different position of the work surface.

In accordance with an aspect of the present invention, in the beam processor, the plurality of reflectors is disposed at positions where each optical path length from the output source to the work surface via the plurality of reflectors is nearly the same.

In accordance with an aspect of the present invention, the beam processor further comprises a processing pattern forming means disposed between the plurality of reflectors and the work surface for forming a processing pattern of the beam radiated onto the work surface.

In accordance with an aspect of the present invention, the beam processor further comprises a plurality of distribution reflectors disposed between the beam moving means and the plurality of reflectors for reflecting the beam moved by the beam moving means and distributing the beam to the plurality of reflectors.

In accordance with an aspect of the present invention, the beam processor further comprises a condenser lens disposed between the plurality of reflectors and the work surface for converging the beam onto the work surface.

In accordance with an aspect of the present invention, the beam processor further comprises a lens moving means for moving the condenser lens along the work surface; and a position control means for controlling the lens moving means and controlling a position of a focal point of the beam on the work surface.

In accordance with an aspect of the present invention, the beam processor further comprises a control beam radiating means for radiating the work surface with a control beam with the same axis as the beam; a control beam detecting means for detecting the control beam reflected by the work surface; and a beam control means for controlling a radiation position of the beam on the work surface and/or an output of the beam on the basis of the control beam detected by the control beam detecting means.

In accordance with an aspect of the present invention, the beam processor further comprises a camera for acquiring an image of the work surface; and a beam control means for controlling a radiation position of the beam on the work surface on the basis of the image taken by the camera.

Effects of the Invention

In the beam processor according to the present invention, the beam radiated from the output source is moved by the beam moving means and then reflected by the plurality of reflectors to conduct the beam to the work surface of the workpiece nearly vertically. Thus, the beam processor of the present invention can process the work surface of the workpiece fast and precisely. The beam processor of the present invention can process a wide area of the workpiece by conducting the beam without enlarging the size. Furthermore, the beam processor of the present invention can radiate the beam onto the work surface of the workpiece from up to down nearly vertically to perform, for example, precise processing and image measurement by using the mask plate.

BRIEF DESCRIPTION OF THE DRAWINGS

FIGS. 17A, 17B, 17C, 17D, and 17E are total controlling flowcharts of the laser beam processor in accordance with the present invention.

DESCRIPTION OF THE PREFERRED EMBODIMENTS

The embodiments of the present invention will be described below in reference to the figures.

First Embodiment

Configuration of the First Embodiment

Figure 1:
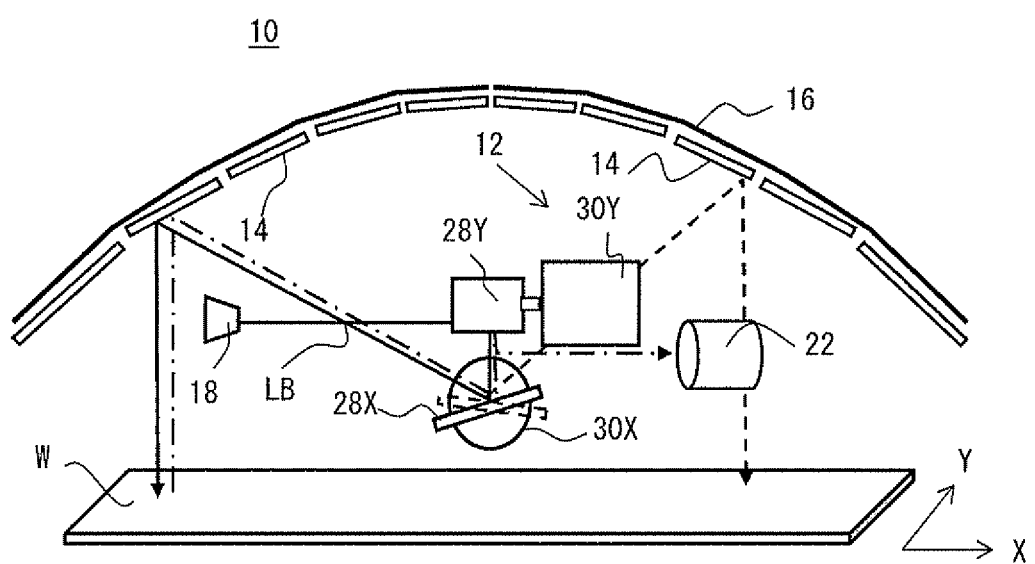
FIG. 1 is a schematic view of a laser beam processor in accordance with the first embodiment of the present invention.
Figure 2:
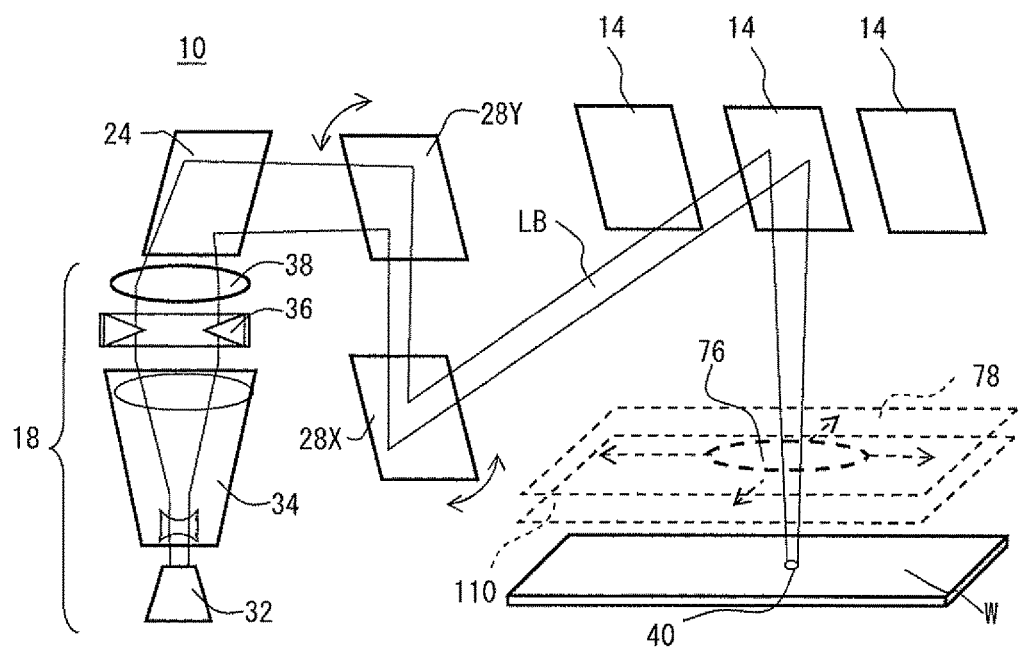
FIG. 2 is an explanatory drawing of the optical path of a laser beam in the laser beam processor in accordance with the first embodiment of the present invention.
Figure 3A:
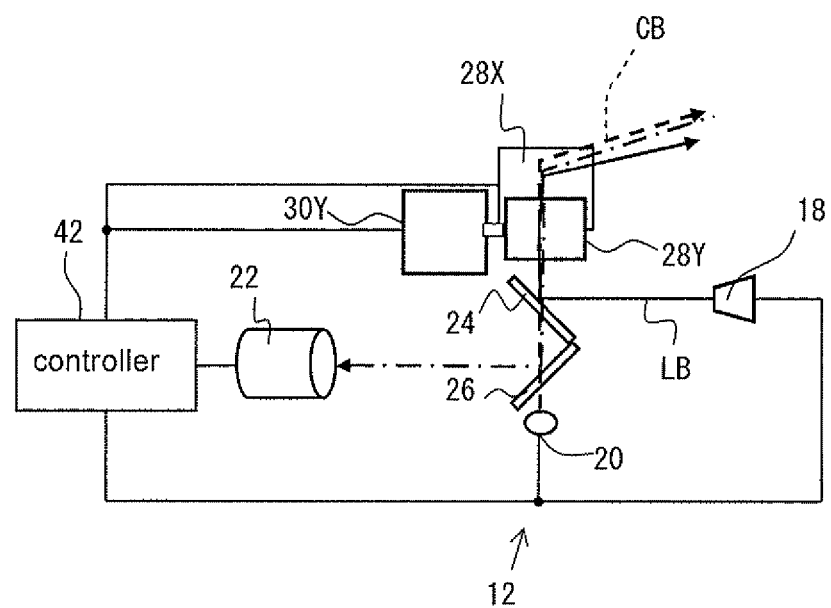
FIG. 3A is a schematic view of a beam moving unit constituting the laser beam processor in accordance with the first embodiment of the present invention.
Figure 3B:
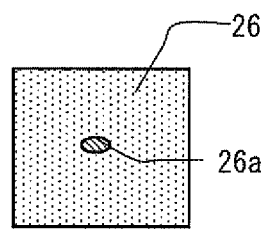
FIG. 3B is an explanatory drawing of a mirror for a camera constituting the beam moving unit.

FIG. 1 is a schematic view of a laser beam processor 10 in accordance with the first embodiment of the present invention to which the beam processor in accordance with the present invention is applied. FIG. 2 is an explanatory drawing of the optical path of a laser beam LB in the laser beam processor 10. FIG. 3A is a schematic view of a beam moving unit 12 (beam moving means) constituting the laser beam processor 10. FIG. 3B is an explanatory drawing of a mirror 26 for the camera constituting the beam moving unit 12.

The laser beam processor 10 is a machine for processing a workpiece W to the desired state by irradiating the work surface of the workpiece W with the laser beam LB and by moving the laser beam LB on the work surface. For example, the laser beam processor 10 can be applied to various laser beam processors such as laser markers, laser cutting machines, laser welding machines, laser soldering machines, and glass sealing machines. These machines can form the desired processing pattern on the workpiece W by controlling the laser beam LB to be conducted onto the workpiece W.

The laser beam processor 10 comprises the beam moving unit 12 for producing the laser beam LB which moves on the workpiece W and a plurality of flat reflectors 14 which reflects the laser beam LB produced by the beam moving unit 12 to the work surface of the workpiece W. Each of the flat reflectors 14 is fixed on the inner face of an arc-like supporting frame 16. The workpiece W has a long work surface in the direction of an arrow X in FIG. 1. The flat reflectors 14 are arranged with the predetermined intervals in the direction of the arrow X opposed to the workpiece W. Each flat reflector 14 is disposed in the optical path of the laser beam LB between the beam moving unit 12 and the work surface of the workpiece W. Each flat reflector 14 is inclined a predetermined angle to the incident direction of the laser beam LB and fixed to the supporting frame 16 so that each flat reflector 14 reflects the laser beam LB output from the beam moving unit 12 and the laser beam LB is radiated from up to down and distributed onto the different positions of the work surface of the workpiece W nearly vertically. Here, "distribute" means that the work surface of the workpiece W is distributed to each flat reflector 14. The form of the inner face of the supporting frame 16 to which the flat reflectors 14 are fixed is formed so that the laser beams LB from the beam moving unit 12 to the work surface of the workpiece W via the flat reflectors 14 have substantially the same optical path length. Therefore, each flat reflector 14 is disposed in substantially the same optical path length from the beam moving unit 12 to the work surface of the workpiece W via each flat reflector 14.

Here, "the same optical path length" means that these optical path lengths are the same when the beam spot diameter of each laser beam LB on the work surface of the workpiece W is within the allowable range of the necessary beam spot diameter. When the ratio of the error of the beam spot area which is within the allowable range of the beam spot diameter is constant, the allowable error of the optical path length with a small beam spot diameter becomes small proportional to the beam spot diameter, whereas the optical path length is within the allowable range of the necessary beam spot diameter relative to the objective lens when the objective lens is disposed on the workpiece W. The position of the flat reflectors 14 need not be disposed in an arc, but can be disposed in any position when the error of the optical path length relative to the objective lens is within the allowable range of the necessary beam spot diameter and the laser beam is the parallel beam without convergence or divergence.

As depicted in FIG. 3A, the beam moving unit 12 comprises a laser source 18 (output source) which outputs the laser beam LB, a light-emitting diode (LED) 20 (control beam radiating means) which outputs a control beam CB whose wavelength is different from the laser beam LB, and a camera 22 (control beam detecting means) which receives the control beam CB reflected by the work surface of the workpiece W. The beam moving unit 12 also comprises a half mirror 24 which reflects the laser beam LB and transmits the control beam CB, the mirror 26 (FIG. 3B) which has an aperture 26a through which the control beam CB output from the LED 20 passes and reflects the control beam CB transmitted through the half mirror 24 to conduct the beam to the camera 22, a galvanometer mirror 28Y which moves the laser beam LB on the workpiece W in the direction of an arrow Y, a galvanometer mirror 28X which moves the laser beam LB on the workpiece W in the direction of the arrow X, and galvanometer motors 30X, 30Y (FIG. 1) which rotate the galvanometer mirrors 28X, 28Y, respectively. The camera 22 is connected to a controller 42 (beam control means) which controls the irradiation position of an irradiation point 40 of the laser beam LB on the workpiece W and/or controls the output of the laser beam LB, on the basis of the beam profile of the received control beam CB or the received light amount of the received control beam CB.

The optical axes of the laser source 18 and the LED 20 are formed coaxially between the half mirror 24 and the workpiece W. As depicted in FIG. 3B, the aperture 26a formed in the mirror 26 is formed by peeling in an ellipse, the mirror finish coating of the mirror 26 whose reflecting surface is inclined about 45° from the optical axis of the control beam CB so that the control beam CB output from the LED 20 makes the circular irradiation point 40 on the workpiece W. The area of the aperture 26a is preferably formed, for example, 1/25 or smaller of the receiving area of the control beam CB received by the camera 22 so that the control beam CB reflected by the workpiece W can be conducted enough to the camera 22. Here, between the LED 20 and the aperture 26a of the mirror 26 may be connected with the optical fiber. The optical path length between the camera 22 and workpiece W is formed on the basis of the observed or measured field including the irradiation point 40 of the laser beam LB taken by the camera 22.

As depicted in FIG. 2, the laser source 18 is composed of a laser oscillator 32, a beam expander 34, a beam diaphragm 36, and a beam focusing lens 38. Here, the arrangement order of the beam diaphragm 36, the beam focusing lens 38, and the half mirror 24 disposed at the downstream of the beam focusing lens 38 are optional. The beam focusing lens 38 forms the irradiation point 40 by focusing the laser beam LB output from the laser oscillator 32 on the work surface of the workpiece W. The laser oscillator 32 is connected to the controller 42 for controlling the laser beam LB so as to form the desired processing pattern on the work surface of the workpiece W (FIG. 3A).

Figure 4:
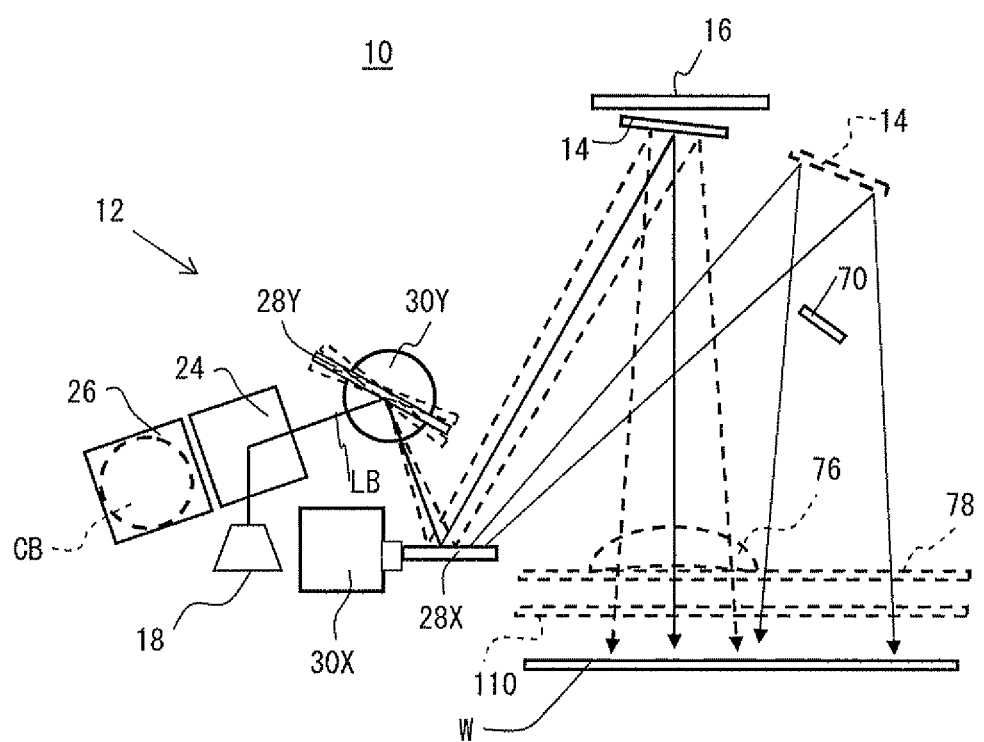
FIG. 4 is an explanatory drawing of the position of the beam moving unit constituting the laser beam processor in accordance with the first embodiment of the present invention.

FIG. 4 shows the position where the beam moving unit 12 is disposed so as not to interrupt the optical path of the laser beam LB. That is to say, the beam moving unit 12 is not disposed between the workpiece W and the flat reflectors 14, but shifted by a predetermined amount to the left side of FIG. 4 in the direction of the arrow Y of FIG. 1. Therefore, the laser beam LB is reflected by the flat reflectors 14 and then conducted to the work surface of the workpiece W without being interrupted by the beam moving unit 12. Here, the flat reflectors 14 are disposed to be inclined a predetermined angle in the direction of the arrow Y of FIG. 1 so as to conduct the laser beam LB to the work surface of the workpiece W nearly vertically. The optical path length of the laser beam LB from the beam moving unit 12 to the workpiece W via the flat reflectors 14 and the inclination angle of the flat reflectors 14 can be calculated by computer simulation or geometric calculation.

Figure 5A:
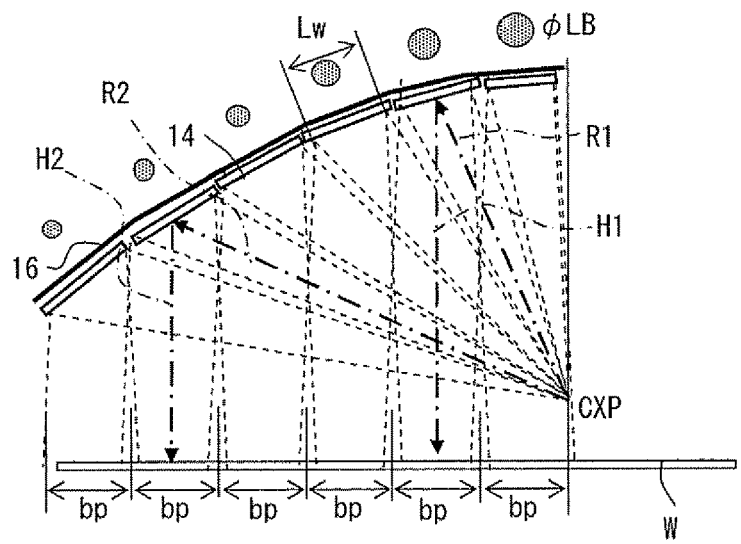
FIGS. 5A, 5B, and 5C are explanatory drawings of parameters including the position of a flat reflector in the laser beam processor in accordance with the first embodiment of the present invention.

Then, the parameters including the position of the flat reflectors 14 will be described on the basis of FIGS. 5A, 5B, and 5C. Here, FIG. 5A depicts only the left side of the laser beam processor 10 in FIG. 1.

Figure 5B:
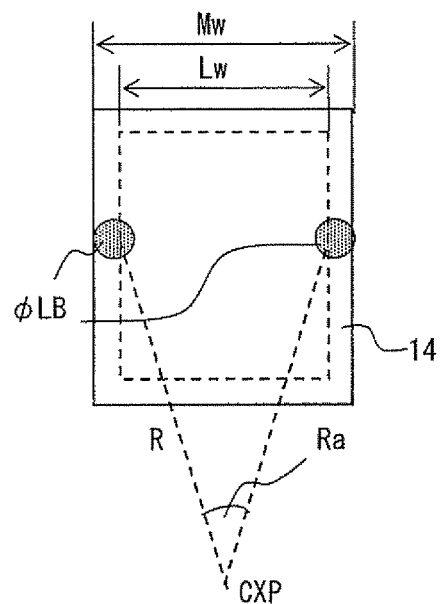
Figure 5C:
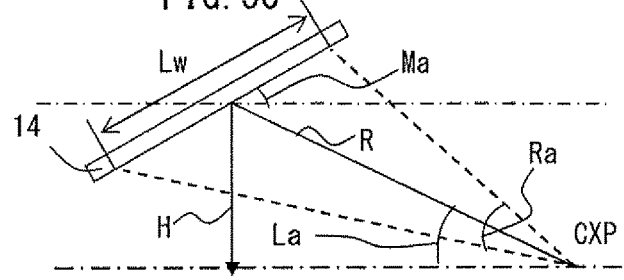

As depicted in FIG. 5B, widths Mw of the flat reflectors 14 in the array direction are values obtained by adding effective widths Lw of the flat reflectors 14 to beam diameters $\varphi LB$ which are the beam diameters of the laser beam LB on the flat reflectors 14. The effective widths Lw are determined by equation (1) using deflecting angle Ra of the laser beam LB relative to rotating center CXP of the galvanometer mirror 28X, distance R from the rotating center CXP to the centers of the flat reflectors 14, angle La (FIG. 5C) of the laser beam LB incident to the centers of the flat reflectors 14 based on the work surface of the workpiece W, and the beam diameter $\varphi LB$.

$$Lw=2R\cdot\sin((\pi/2+La-Ra)/2)\cdot\sin Ra+\varphi LB \quad (1)$$

Each position of the flat reflector 14 is determined by equation (2) using distances R1, R2 which are the distances from the rotating center CXP of the galvanometer mirror 28X to the centers of optionally selected two flat reflectors 14, and H1, H2 which are the distances from the centers of the optionally selected two flat reflectors 14 to the work surface of the workpiece W on the condition that the optical path lengths are the same.

$$H1+R1\approx H2+R2 \quad (2)$$

Here, the width by with which each laser beam LB reflected by each flat reflector 14 moves on the work surface of the workpiece W (FIG. 1) in the direction of the arrow X is nearly the same.

Furthermore, attached angles Ma of the flat reflectors 14 based on the work surface of the workpiece W are determined by equation (3) on the condition that the laser beam LB is radiated onto the work surface of the workpiece W from up to down nearly vertically.

$$Ma=(\pi/2-La)/2 \quad (3)$$

Operation Explanation of the First Embodiment

The operation of the laser beam processor 10 will be described below.

The controller 42 outputs the control beam CB output from the LED 20 by driving the LED 20 of the beam moving unit 12. The control beam CB from the LED 20 passes through the aperture 26a of the center of the mirror 26 and then transmits the half mirror 24 and is moved in the directions of the arrow X and Y by the galvanometer mirrors 28X, 28Y which are rotated by the galvanometer motor 30X, 30Y. The control beam CB moved is reflected by each flat reflector 14 fixed to the supporting frame 16 and then radiated onto the work surface of the workpiece W. Then, the control beam CB reflected by the work surface passes through the same optical path, reflected by the mirror 26 of the beam moving unit 12, and then is received by the camera 22. The controller 42 processes the image of the control beam CB received by the camera 22 and acquires the information of the irradiation point 40 such as the position information of the irradiation point 40, the light amount information of the control beam CB received, and the information of the character of the workpiece W.

The controller 42 drives the laser oscillator 32 of the beam moving unit 12 and the laser beam LB is output from the laser oscillator 32 in the same time the control beam CB is output or after acquiring the information on the basis of the control beam CB. The laser beam LB output from the laser oscillator 32 is reflected by the half mirror 24 and then moved in the directions of the arrow X and Y by the galvanometer mirrors 28X, 28Y, same as the control beam CB. The moved laser beam LB is reflected by each flat reflector 14 fixed to the supporting frame 16 and then radiated onto the work surface of the workpiece W. In this time, the controller 42 controls the irradiation position of or adjusts the output of the laser beam LB on the basis of the information of the irradiation point 40 acquired by the camera 22. Thus, the controller 42 can radiate the laser beam LB precisely onto the work surface of the workpiece W and form the desired processing pattern.

In this case, the laser beam processor 10 can expose or print the image or the character at the irradiation point 40 by disposing the liquid crystal mask or the digital mirror device (DLP) between the beam diaphragm 36 and the half mirror 24 and producing the desired processing pattern by modulating the laser beam LB. Therefore, the laser beam processor 10 can form characters, patterns, marks, the design of codes, and the like rapidly and broadly by comparison with the prior processing machines such as laser markers for processing the workpiece W. The laser beam processor 10 can expose the high definition microcircuit by optionally adjusting the beam spot diameter of the irradiation point 40. Furthermore, the laser beam processor 10 can process the workpiece W, while the camera 22 takes the neighboring images of the irradiation point 40, checking the design of the images and modifying or adjusting the design of the images corresponding to the position of the irradiation point 40. Therefore, the laser beam processor 10 can process the different circuits or the patterns of the image by combining more than one such continuous irradiation point 40.

Second Embodiment

Figure 6A:
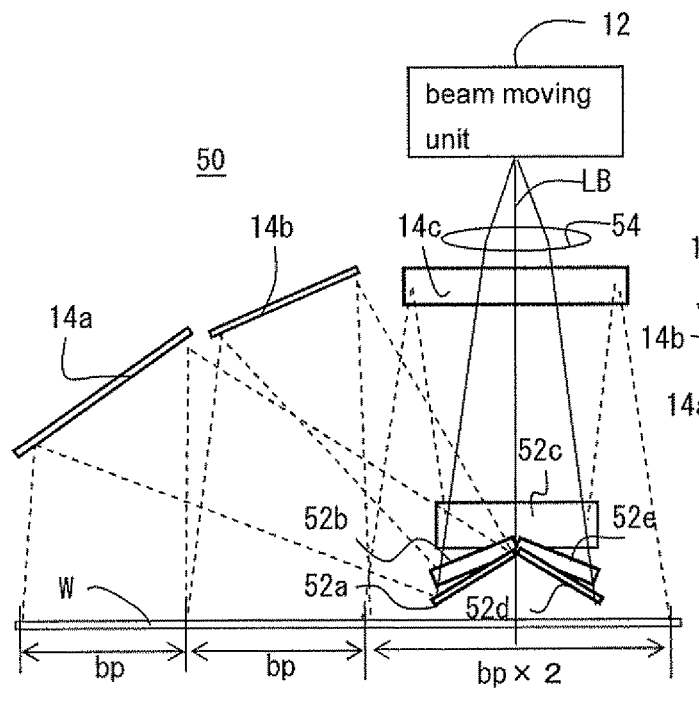
FIG. 6A is a schematic view of the left half part of a laser beam processor in accordance with the second embodiment of the present invention.
Figure 6B:
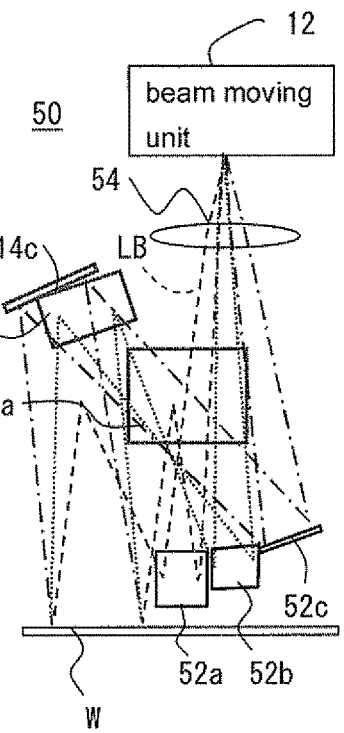
FIG. 6B is a side schematic view of FIG. 6A.
Figure 6C:
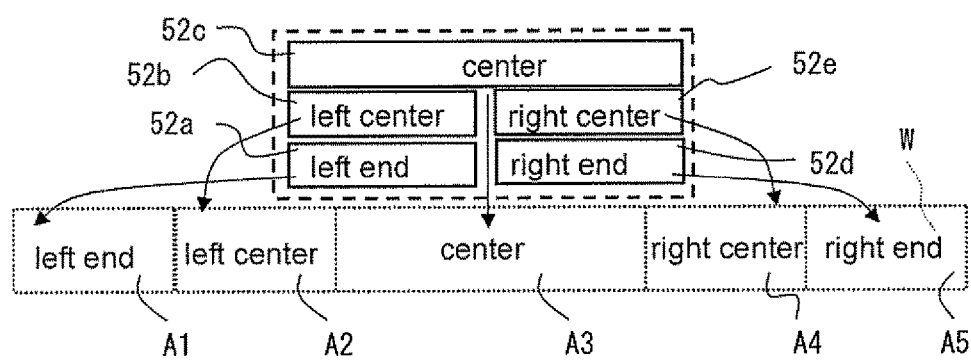
FIG. 6C is an explanatory drawing of the correspondence relation between the position of a distribution mirror constituting the laser beam processor and the processing area of the workpiece in accordance with the second embodiment of the present invention.

FIGS. 6A and 6B are schematic views of a laser beam processor 50 in accordance with the second embodiment. FIG. 6C is an explanatory drawing of the correspondence relation between the positions of 5 pieces of distribution mirrors 52a to 52e constituting the laser beam processor 50 and processing areas A1 to A5 of the workpiece W. Here, FIGS. 6A and 6B depict schematic views of the left half part of the laser beam processor 50, same as FIG. 5A.

The laser beam processor 50 comprises five distribution mirrors 52a to 52e and five corresponding flat reflectors 14. The distribution mirrors 52a to 52e are disposed between the beam moving unit 12 and the plural flat reflectors 14. The inclination angles of the distribution mirrors 52a to 52e are the same as the inclination angles of the corresponding flat reflectors 14. The laser beam LB output from the beam moving unit 12 enters each distribution mirror 52a to 52c through an Fθ lens 54 and then reflected to each corresponding flat reflector 14a to 14c. Here, it is not shown, but the laser beam LB that entered each distribution mirror 52d, 52e is reflected toward the corresponding flat reflector 14 disposed in the right of FIG. 6A in the same way. As depicted in FIG. 6C, the laser beam LB reflected by each flat reflector 14 is conducted to the corresponding processing areas A1 to A5 of the workpiece W.

Here, it is different from the laser beam processor 10 in FIG. 1 that the optical path length of the laser beam LB is calculated from the position of the Fθ lens 54. By using the Fθ lens 54, the optical path length is calculated in the light of the extension of the optical path length because the diameter of the irradiation point 40 on the work surface of the workpiece W is the same even if the optical path length extends according to the deflecting angle of the laser beam LB.

According to the laser beam processor 50 constituted in this way, the processor can be arranged with a minimum optical path length. Here, the number of the distribution mirrors 52a to 52e can be increased, but it is inefficient when the diameter of the laser beam LB is large because the invalid areas among the distribution mirrors 52a to 52e increase.

Third Embodiment

Figure 7A:
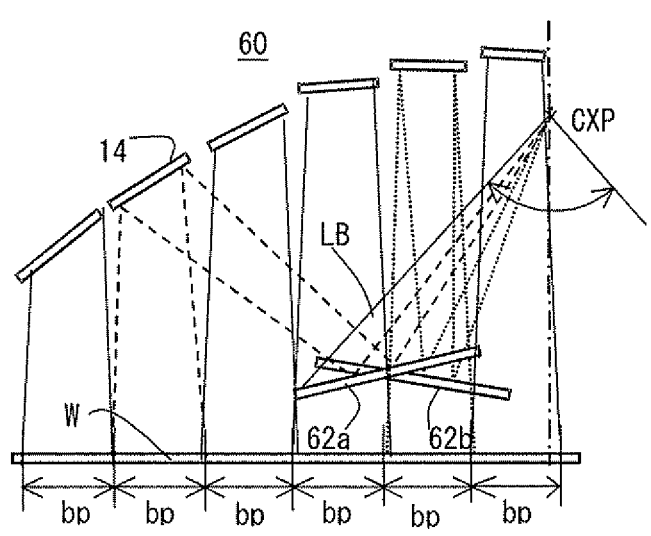
FIG. 7A is a schematic view of the left half part of a laser beam processor in accordance with the third embodiment of the present invention.
Figure 7B:
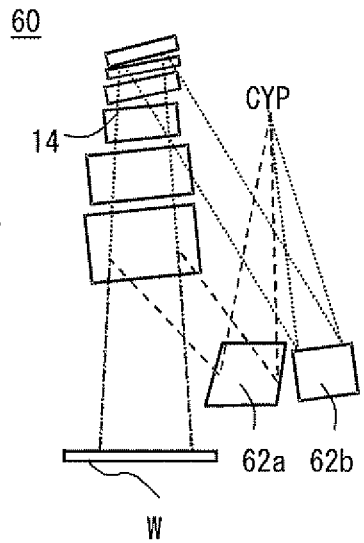
FIG. 7B is a side schematic view of FIG. 7A.
Figure 7C:
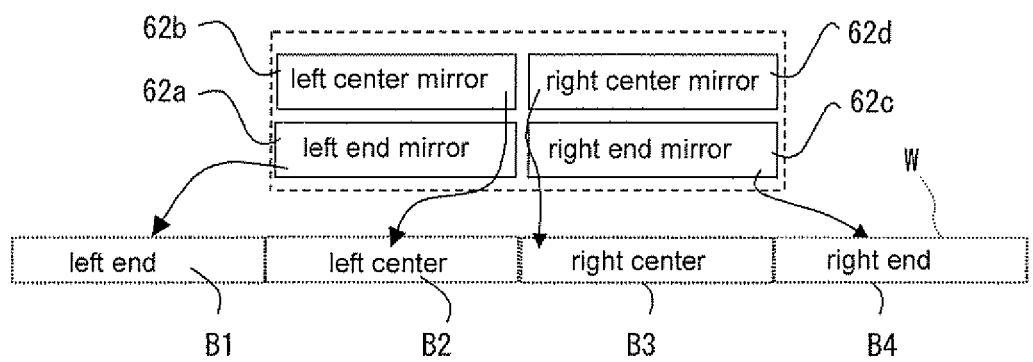
FIG. 7C is an explanatory drawing of the correspondence relation between the position of a distribution mirror constituting the laser beam processor and the processing area of the workpiece in accordance with the third embodiment of the present invention.

FIGS. 7A and 7B are schematic views of a laser beam processor 60 in accordance with the third embodiment. FIG. 7C is an explanatory drawing of the correspondence relation between the position of the four distribution mirrors 62a to 62d constituting the laser beam processor 60 and processing areas B1 to B4 of the workpiece W. Here, FIGS. 7A and 7B depict schematic views of the left half part of the laser beam processor 60, same as FIGS. 6A and 6B.

In the laser beam processor 60, the Fθ lens 54 is eliminated from the laser beam processor 50. The laser beam processor 60 comprises the four distribution mirrors 62a to 62d in the right and left of the deflecting direction with the long reflecting surfaces on the optical path between the beam moving unit 12 and the flat reflectors 14. In this case, each distribution mirror 62a to 62d can conduct the laser beam LB to the two flat reflectors 14 at the same time. Here, CXP is the rotating center of the galvanometer mirror 28X of the beam moving unit 12 and CYP is the rotating center of the galvanometer mirror 28Y.

The laser beam processor 60 constituted in this way can process the workpiece W more efficiently because the number of partitions of the laser beam LB is smaller than the laser beam processor 50.

Modified Embodiment

Figure 8A:
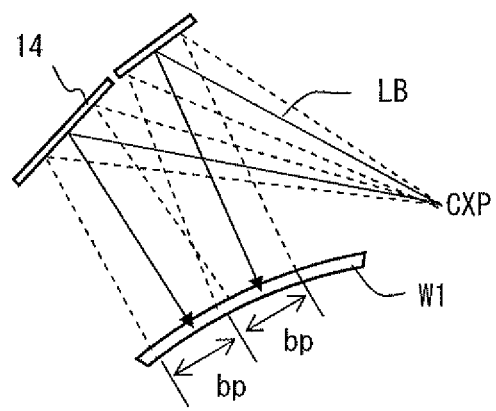
FIGS. 8A and 8B are explanatory drawings of a laser beam processor in accordance with another embodiment of the present invention.

FIG. 8A shows, for example, the positions of the flat reflectors 14, where the optical path lengths of the laser beams LB to a workpiece W1 having a curved surface such as glass bottles, bottles, and steel pipes are the same and where the laser beam LB can be radiated onto the work surface of the workpiece W1 nearly vertically.

Figure 8B:
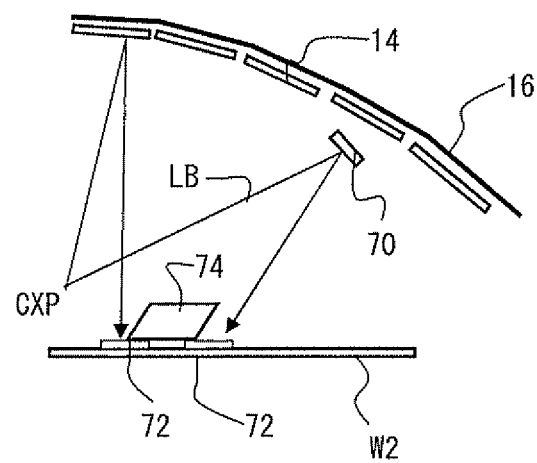

FIG. 8B, in the laser beam processor 10 in FIG. 1, shows a configuration in which a small reflector 70 is inserted into a predetermined position, between a workpiece W2 and the flat reflectors 14, where the optical path length is the same as the flat reflectors 14 (FIG. 4). In this case, for example, a solder 72 is applied onto the workpiece W2 such as a circuit board and then a chip 74 such as a circuit element is mounted on the solder 72. When the laser beam LB is radiated onto the workpiece W2 via the small reflector 70, the solder 72 behind the chip 74 can be melted.

Fourth Embodiment

Figure 9A:
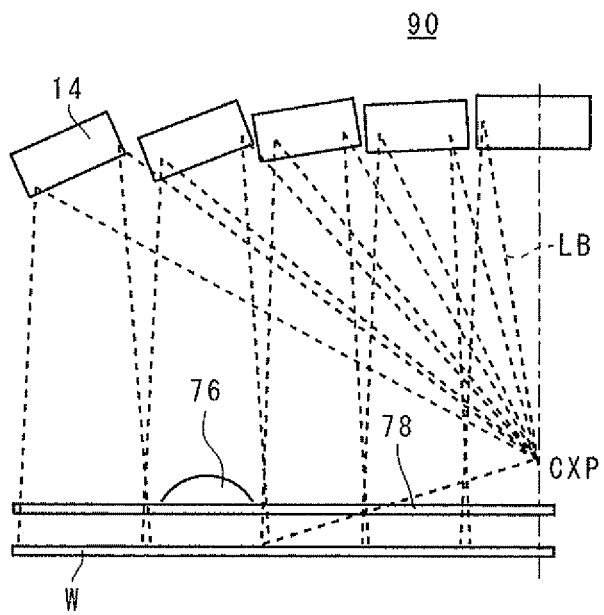
FIG. 9A is a schematic view of the left half part of a laser beam processor in accordance with the fourth embodiment of the present invention.
Figure 9B:
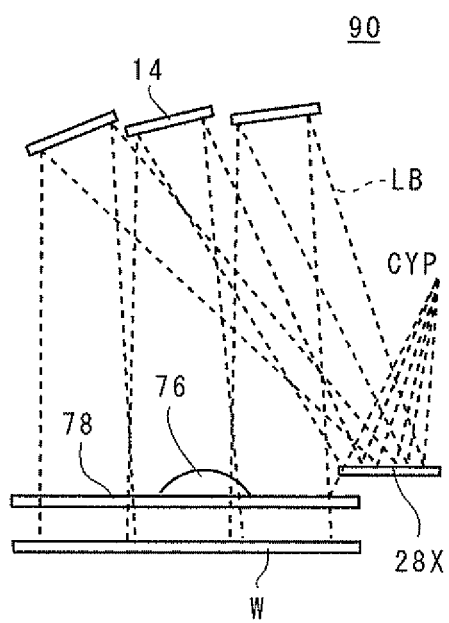
FIG. 9B is a side schematic view of FIG. 9A.

FIGS. 9A and 9B are schematic views of a laser beam processor 90 in accordance with the fourth embodiment.

The laser beam processor 90 is composed so that the laser beam LB of a parallel luminous flux is reflected by each flat reflector 14 arranged along the workpiece W to conduct the laser beam LB to the work surface of the workpiece W. In this case because the laser beam LB conducted to the flat reflectors 14 is the parallel luminous flux, the diameter of the irradiation point 40 formed on the work surface of the workpiece W can be constant, irrespective of the optical path length of the laser beam LB entered into each flat reflector 14. Therefore, the flat reflectors 14 can be disposed at any position. Here, it is understood that the laser beam LB cannot provide the required energy for processing to the work surface when the laser beam LB is radiated as a parallel luminous flux onto the workpiece W. In this case, an objective lens 76 may be disposed in front of the workpiece W to condense the laser beam LB on the workpiece W.

Configuration of the Objective Lens

In each of the above embodiment, the objective lens can be inserted between the work surface of the workpiece W and the flat reflectors 14 in front of the workpiece W (W1, W2) as necessary. Such embodiments will be described below on the basis of FIGS. 10A to 10F.

Figure 10A:
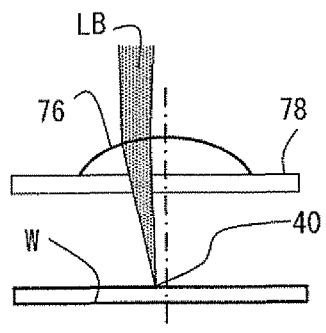
FIG. 10A is a side view of an objective lens in front of the workpiece incorporated in the laser beam processor in accordance with another embodiment of the present invention.
Figure 10C:
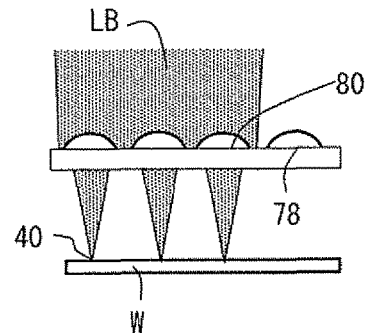
FIG. 10C is a side view of objective lenses in accordance with another embodiment of the present invention.
Figure 10E:
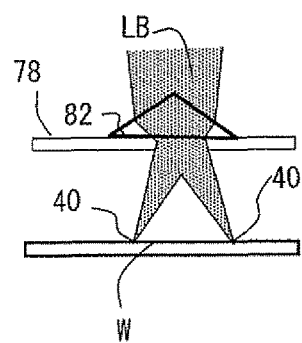
FIG. 10E is a side view of an objective lens in accordance with still another embodiment of the present invention.
Figure 10B:
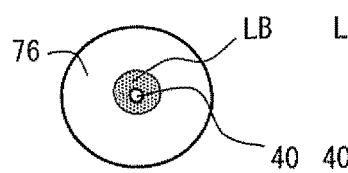
FIG. 10B is a plan view of FIG. 10A.

FIG. 10A is a side view of the objective lens 76 disposed in front of the workpiece W, and FIG. 10B is a plan view of FIG. 10A. The hemispheric objective lens 76 is fixed on a protection glass 78 disposed along with the workpiece W, the plane side thereof being in contact with the protection glass 78. The protection glass 78 is disposed to incline the normal line by, for example, 2° or more to the laser beam LB so that the laser beam LB inclined in this way does not return to the beam moving unit 12. Therefore, the laser oscillator 32 can avoid destruction caused by the laser beam LB entering there. Here, anti-reflect coating may also be applied onto the surfaces of the objective lens 76 and the protection glass 78 without inclination of the protective glass 78.

Figure 10D:
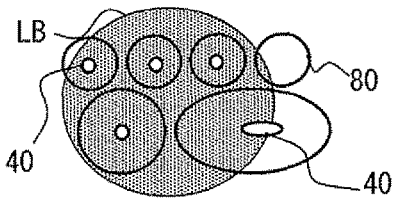
FIG. 10D is a plan view of FIG. 10C.

FIG. 10C is a side view of a plurality of objective lenses 80 disposed in front of the workpiece W. FIG. 10D is a plan view of FIG. 10C. The laser beam LB can be condensed at plural different positions by the plural objective lenses 80 to form the plural irradiation points 40 on the work surface of the workpiece W. Here, selection of the combination of position and form of the plural objective lenses 80 can form the desired processing pattern on the work surface.

Figure 10F:
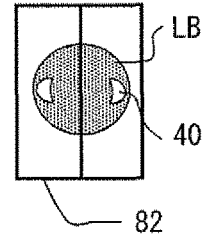
FIG. 10F is a plan view of FIG. 10E.

FIG. 10E is a side view of a prism-type objective lens 82 disposed in front of the workpiece W. FIG. 10F is a plan view of FIG. 10E. The laser beam LB can be condensed at two different positions by the objective lens 82 to form the two irradiation points 40 on the work surface of the workpiece W.

Thus, when the objective lens 76, 80 or 82 is inserted in front of the workpiece W, the position of the irradiation point 40 can be adjusted finely according to the enlargement scale factor of the irradiation point 4 on the work surface of the workpiece W. For example, when the enlargement scale factor of the objective lens 76 is a factor of 10 and the position of the laser beam LB on the workpiece W to the objective lens 76 is controlled by 100 μm, the irradiation point 40 is moved on the workpiece W by 10 μm. When the objective lens 76 magnifies the condensed point of the control beam CB on the workpiece W and the camera 22 detects the condensed point, the position of the laser beam LB can be controlled precisely without changing the specification of the location precision of the laser beam LB or the detecting precision of the camera 22.

Here, when the objective lens 76, 80 or 82 are controlled to move along the workpiece W, the laser beam LB can be radiated onto the work surface without any space even if there are some spaces between the flat reflectors 14.

Here, the methods for moving the irradiation point 40 on the workpiece W include the method for moving the laser beam LB within the range of the objective lens 76, 80, or 82 to the position of the laser beam LB on the workplace W and the method for moving the objective lens 76, 80, or 82 to the laser beam LB.

For example, in the method for moving the objective lens 76 to the laser beam LB, the objective lens 76 can be moved by using the galvanometer motors 30X, 30Y of the beam moving unit 12. The moving amount of the irradiation point 40 is proportional to the angle La of the laser beam LB which enters the flat reflectors 14 as depicted in FIG. 5C. Therefore, the objective lens 76 is moved depending on the moving direction of the irradiation point 40. In this case, the focus position needs to be corrected because the position of the laser beam LB is out of alignment from the taught coordinates when the position between the focus of the objective lens 76 and the irradiation point 40 are out of alignment as depicted in FIG. 10A.

Focus Position Correcting Mechanism

A focus position correcting mechanism 92 for correcting the focus position will be described below on the basis of FIG. 11.

The focus position correcting mechanism 92 comprises two guide rails 94a, 94b extending in the direction of the arrow X along both sides of the protective glass 78 and a moving body 96 which can move in the direction of the arrow X along these guide rails 94a, 94b. In the side of the guide rail 94b, a ball screw 98 which is screwed to the end of the moving body 96 is disposed parallel to the guide rail 94b. The moving body 96 has a guide rail 99 extending in the direction of the arrow Y, and the objective lens 76 disposed to be able to move along the guide rail 99 in the direction of the arrow Y.

The galvanometer motor 30X which constitutes the beam moving unit 12 is connected to the ball screw 98 via a gear train 100. Therefore, the moving body 96 can move in the direction of the arrow X so that the focus position of the laser beam LB corresponds to the position of the center of the field of view of the camera 22 on the basis of the rotation of the galvanometer mirror 28X by the galvanometer motor 30X. One end of a wire 102 is connected to the objective lens 76 and the other end of the wire 102 is connected to the galvanometer motor 30Y constituting the beam moving unit 12 via a gear train 104. Therefore, the objective lens 76 is movable in the direction of the arrow Y so that the focus position of the laser beam LB corresponds to the position of the center of the field of view of the camera 22 on the basis of the rotation of the galvanometer mirror 28Y by the galvanometer motor 30Y. The galvanometer motors 30X and 30Y are the lens moving means which moves the objective lens 76 along the work surface and controls the position of the converging point of the laser beam LB on the work surface by the control of the controller 42 serving as the position control means. Here, the objective lens 76 may be moved by a moving means other than the galvanometer motors 30X, 30Y.

The focus position of the objective lens 76 can be corrected to the taught coordinates of the laser beam LB radiated onto the work surface by moving the objective lens 76 along the workpiece W within a radiating area SW of the laser beam LB on the basis of the rotation of the galvanometer mirrors 28X, 28Y by the galvanometer motors 30X, 30Y. Here, the focus position need not precisely coincide with the irradiation point 40. For example, the location precision of the objective lens 76 may be controlled by 1 mm when the irradiation point 40 is controlled to move by 10 μm. Therefore, some errors may be permitted in the gear trains 100, 104, the wire 102, and the like.

Figure 11:
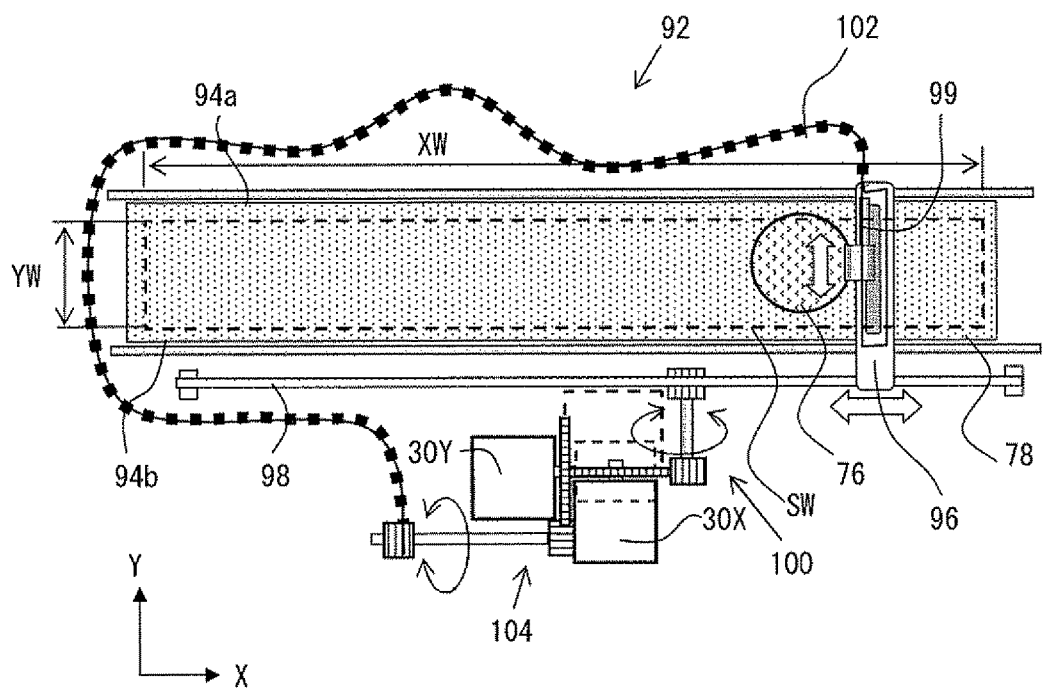
FIG. 11 is a schematic view of a focus position correcting mechanism incorporated in the laser beam processor in accordance with the present invention.
Figure 12A:
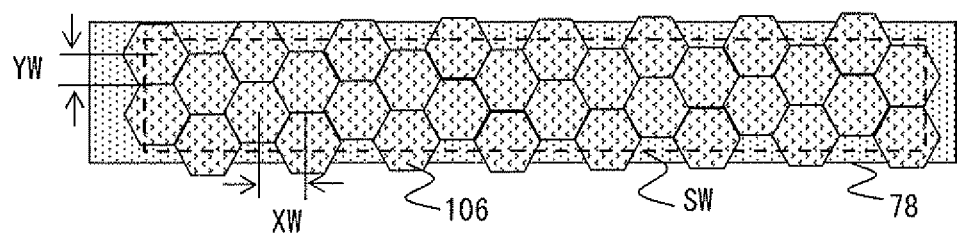
FIGS. 12A and 12B are explanatory drawings of another configuration of the objective lens incorporated in the laser beam processor in accordance with the present invention.
Figure 12B:
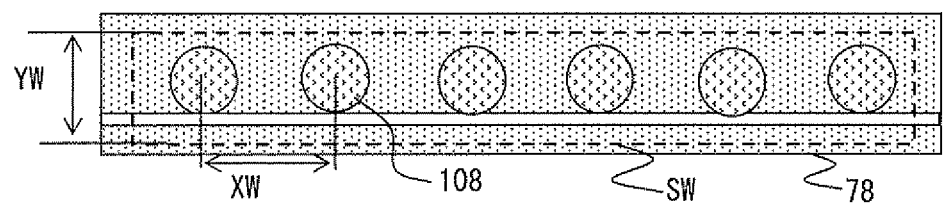

As depicted in FIG. 12A or 12B, a number of objective lenses 106 or 108 can be used corresponding to the irradiation point 40 of the laser beam LB in the focus position correcting mechanism 92 in FIG. 11 when one objective lens 76 cannot move fast within all areas of moving ranges XW, YW.

In FIG. 12A, the hexagonal objective lenses 106 are disposed so as to cover the whole range of a radiating area SW and thus effects equivalent to the focus position correcting mechanism 92 in FIG. 11 can be acquired by only moving each objective lens 106 in a size within the range XW, YW. In FIG. 12B, the circular objective lenses 108 are disposed in the predetermined interval in the direction of the arrow X and effects equivalent to the focus position correcting mechanism 92 in FIG. 11 can be acquired by moving each objective lens 108 to the moving range XW of the adjacent objective lenses 108 in the direction of the arrow X and the moving range YW of the irradiating range SW in the direction of the arrow Y.

Here, in the laser beam processor 90 in FIGS. 9A and 9B, the objective lens 76 may be moved by other independent motor instead of the galvanometer motors 30X, 30Y because the laser beam LB radiated onto the workpiece W is not the convergent beam but the parallel luminous flux. In this case, each process of the position control of the objective lens 76, the scaling of the irradiation point 40, and the focus position correction is executed by calculating the coordinates of the irradiation point 40 using the correlation table which relates to the position of the irradiation point 40 corresponding to each flat reflector 14, the rotation angle of the galvanometer mirrors 28X, 28Y, and the optical path length.

Here, the correlation table is made by recording the rotation angle of the galvanometer mirrors 28X, 28Y and the optical path length by applying the measuring device in the beam moving unit 12 on the basis of the image acquired at each position of the necessary irradiation point 40 because there are some installation errors in the flat reflectors 14, the camera 22, and the beam moving unit 12. This correlation table can also be applied to the focus position correcting mechanism in other laser beam processors 10, 50 and 60.

Configuration of the Mask Plate

Figure 13A:
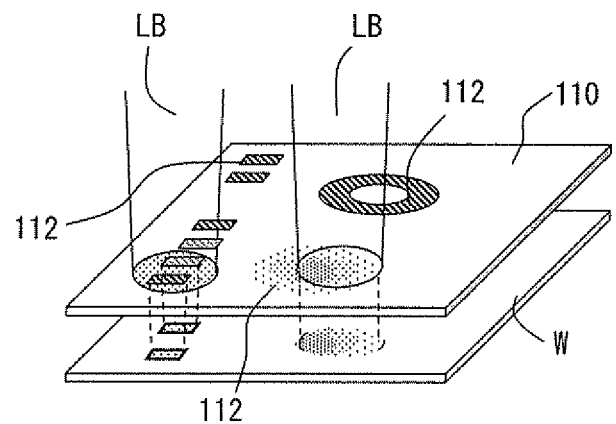
FIG. 13A is a perspective view of a mask plate incorporated in the laser beam processor in accordance with the present invention.
Figure 13B:
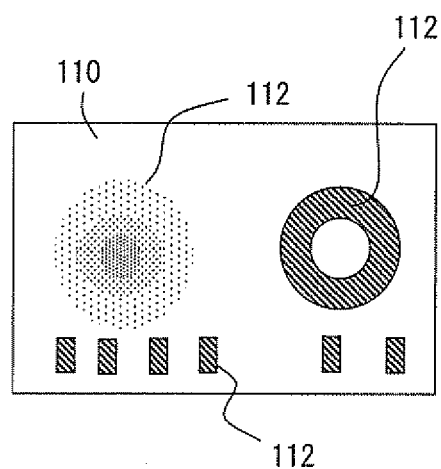
FIG. 13B is a plan view of the mask plate.

In each embodiment above, the mask plate (processing pattern forming means) in which the mask pattern is formed can be inserted between the work surface of the workpiece W and the flat reflectors 14 in front of the workpiece W (W1, W2), as necessary. This embodiment will be described below on the basis of the perspective view in FIG. 13A and the plan view in FIG. 13B. Here, the mask plate can be used along with the objective lenses 76, 106, and 108 described above (FIG. 2).

A mask plate 110 has a mask pattern 112 in which the penetration efficiency of the laser beam LB is partially different. The mask pattern 112 can be formed into a diversiform such as a toroidal form, a rectangular form, and a cross form corresponding to the processing pattern of the laser beam LB formed on the work surface of the workpiece W. The mask pattern 112 can be in the form having a penetration efficiency of nearly zero % or a penetration efficiency continuously variable. The laser beam LB transmitted the mask pattern 112 processes the work surface of the workpiece W to the predetermined state by applying heat corresponding to the penetration efficiency to the work surface.

For the materials of the mask plate 110, the stainless plate in which the mask pattern 112 is formed can be used. In addition, the mask plate 110, for example, can be composed of the glass plate through which the laser beam LB and the control beam CB can be transmitted to scatter the laser beam LB and defocus on the workpiece W by processing the work surface partially to be frosted corresponding to the mask pattern 112. Furthermore, the mask plate 110 made of a glass plate may have a coating film on its surface, which transmits the control beam CB and does not transmit the laser beam LB.

Furthermore, the mask pattern 112 may be formed by the cream solder on the mask plate 110 and this mask plate 110 may be disposed to be in contact with the workpiece W. In this case, the cream solder is melted by the heat energy of the laser beam LB radiated to the mask plate 110 and the solder having a form corresponding to the form of the mask pattern 112 can be transcribed onto the workpiece W.

Here, as depicted in FIG. 10C or 10E, the desired mask pattern can be formed by the position of the objective lens 80 or 82 fixed on the protective glass 78.

By selecting such various mask patterns 112 and defining the form of the laser beam LB on the work surface or the distribution of the heat energy, the laser beam processor can be applied to various processes such as soldering processes, boring processes, cutting processes, and heating processes.

Example of Processing

Figures 14A, 14B:
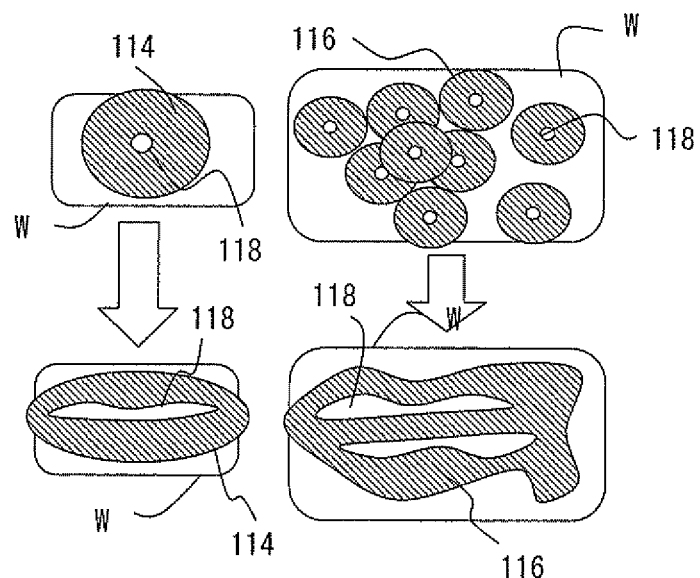
FIGS. 14A and 14B are explanatory drawings of the image of solder on the workpiece.

FIGS. 14A and 14B depict images 114, 116 of the reflected control beam CB acquired by the camera 22 by radiating the control beam CB onto the workpiece W, the work surface on which the hemispherical solder is pasted. The images 114, 116 of the upper part of each figure is the before irradiation images of the laser beam LB and the images 114, 116 of the lower part of each figure is the after irradiation images of the laser beam LB for the predetermined time.

In this case, because most of the control beam CB reflected by the surface perpendicular to the optical axis of the control beam CB entered into the workpiece W is returned to the camera 22 without scattering, a bright spot 118 appears in the images 114,116. The form or the position of this bright spot 118 varies largely by the deformation of the form of the solder melted by the heat of the laser beam LB. Therefore, the solder can be the desired state by monitoring and controlling the state of the bright spot 118.

Figure 14C:
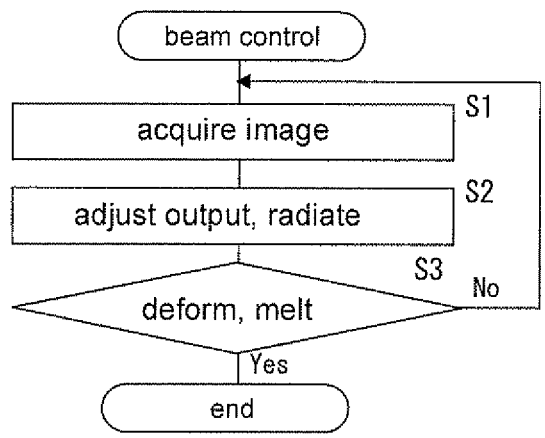
FIG. 14C is a flowchart of the beam control process on the basis of the image of solder.

FIG. 14C is a flowchart of the beam control process of the laser beam LB by the controller 42 in FIG. 3. The controller 42 acquires the images of the control beam CB which is output from the LED 20 and radiated onto the workpiece W via the camera 22 (step S1). Then, the controller 42 processes the acquired images, adjusts the output power of the laser beam LB output from the laser oscillator 32 corresponding to the position or the form of the bright spot 118, and then radiates the laser beam LB onto the workpiece W (step S2). The controller 42 determines the deformation state or the melting state of the solder from the position or the form of the bright spot 118 (step S3) and reiterates the processes for acquiring the images and adjusting the laser beam LB. Thus, the solder can be formed in the desired melting state by beam controlling.

Figure 15A:
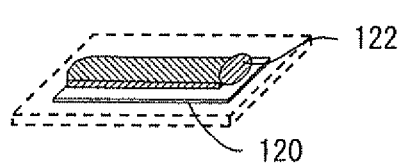
FIG. 15A is an explanatory drawing of the workpiece as the processing target.

FIG. 15A depicts the workpiece on which a rectangular lead 122 as the processing target is disposed on a rectangular copper foil 120. The upper part in FIG. 15B is an image 124 before irradiation of the laser beam LB and the lower part in FIG. 15B is an image 126 after irradiation in which the solder pasted or disposed on the lead 122 or the lead 122 is melted by radiating the laser beam LB for the predetermined time. In this case, the laser beam LB is radiated onto the workpiece in the rectangular processing pattern corresponding to the form of the lead 122.

Figure 15C:
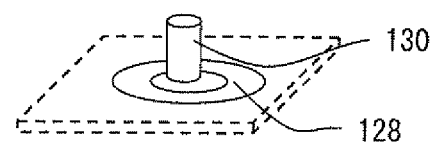
FIG. 15C is an explanatory drawing of another workpiece as the processing target.
Figure 15B:
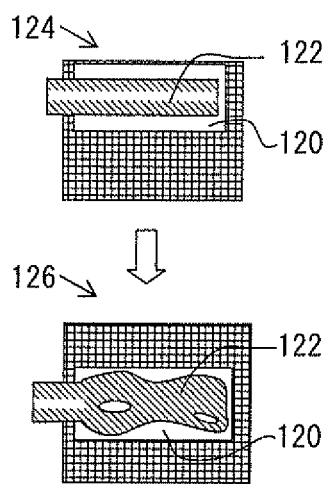
FIG. 15B is an explanatory drawing of the image of the workpiece of FIG. 15A.
Figure 15D:
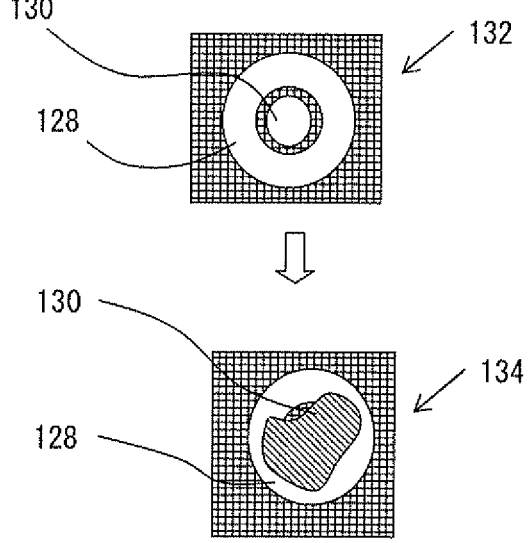
FIG. 15D is an explanatory drawing of the image of the workpiece of FIG. 15C.

FIG. 15C depicts the workpiece on which a cylindrical lead 130 as the processing target is disposed on a ring copper foil 128. The upper part in FIG. 15D is an image 132 before irradiation of the laser beam LB and the lower part in FIG. 15B is an image 134 after irradiation in which the solder pasted or disposed on the lead 130 or the lead 130 is melted by radiating the laser beam LB for the predetermined time. In this case, the laser beam LB is radiated onto the workpiece W in the ring processing pattern corresponding to the form of the lead 128.

Figure 16:
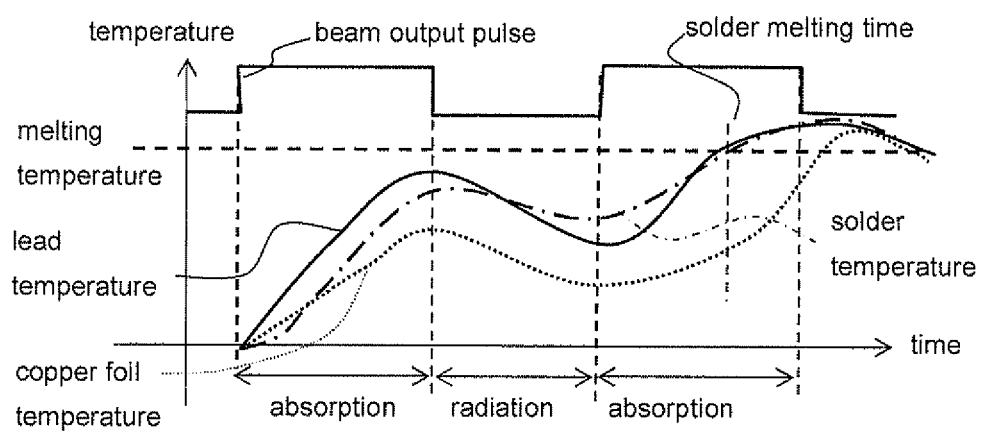
FIG. 16 is an explanatory drawing of the correspondence relation between the output pulse of the laser beam and the temperature of the workpiece.

FIG. 16 depicts the relation between the output pulse of the laser beam LB radiated onto the workpiece W in FIGS. 15A to 15D and the temperature of the copper foils 120, 128, the leads 122, 130, and the solder. It is ideal that the adequate soldering is performed at the same temperature as the target. However, when a heat ray such as the laser beam LB is radiated onto the target, the reflectances of the copper foils 120, 128, the leads 122, 130, and the solder differ, and thus, the absorptances of the heat of the heat ray also differ greatly. For example, the leads 122, 130 and the solder absorb the heat ray at 808 nm and the copper foils 120, 128 reflect this heat ray. The oxidized copper foils 120, 128 melts and holes are opened therein before the solder melts. Therefore, the output pulse of the laser beam LB is set in consideration of the absorptances of the heat of the copper foils 120, 128 and the leads 122, 130. Here, it is suitable to adjust the output pulse of the laser beam LB for adequate soldering in combination with an infrared camera in the beam moving unit 12 and measure the temperature of the target.

Total Control Flowchart

Then, according to the laser beam processors 10, 50, 60, and 90 described above, the total operation of the system incorporated with the focus position correcting mechanism 92 in FIG. 11 will be described below on the basis of the flowcharts in FIGS. 17A to 17E.

When the system is started, the controller 42 reads out the control command from the processing program (step S11, FIG. 17A) and executes the check process of the laser beam LB (step S13) when the control command is the check command (step S12, YES).

At first, the correcting process of the position of the focus is executed in the check process (step S13A, FIG. 17B).

Now, the controller 42 drives the galvanometer motors 30X and 30Y of the beam moving unit 12 (step SA1, FIG. 17C) and the objective lens 76 is moved via the gear trains 100,104 in the directions of the arrow X and Y (FIG. 11). The controller 42 conducts the control beam CB output from the LED 20 to the workpiece W, the camera 22 takes the image of the work surface including the control beam CB reflected by the workpiece W, and the image of the work surface is acquired (step SA2). Then, the controller 42 processes the acquired image and recognizes the form of the target on the work surface of the workpiece W. The controller 42 locates the position of the objective lens 76 to the workpiece W according to the recognition form. In this case, the field of view of the image on the basis of the control beam CB that entered the camera 22 is formed much larger than the area of the beam spot of the laser beam LB. Therefore, the controller 42 can correct the focus position of the objective lens 76 roughly to the processing position which is the irradiation position of the laser beam LB on the basis of the image acquired from the field of view (step SA3). The controller 42 reiterates the processes from the step SA1 when the focus position of the objective lens 76 is out of alignment from the desired position of the irradiation point 40 by teaching and determined that the correction of the focus position is needed in spite of the correction of the position of the objective lens 76 (step SA4, YES). On the other hand, when the correction of the position of the focus is not needed (step SA4, NO) and the form is recognized (step SA5, NO), the positioning process is ended. When the form is not recognized (step SA5, YES), the error process is executed and all processes are ended (step SA6).

When the correcting process of the focus position is ended, the controller 42 executes other various checks (step S13B, FIG. 17B) and records or saves the checked data (step S13C).

Then the controller 42 executes the processing process (step S15) of the workpiece W by the laser beam LB when the control command is the processing command (step S14, YES).

In the processing process, the controller 42 corrects the focus position of the laser beam LB associated with the misalignment of the focus position of the measurement including the wavelength of the laser beam LB or the camera 22 (step S15A, FIG. 17D), and then processes the workpiece W by controlling the laser beam LB (step S15B).

In controlling the beam, the controller 42 acquires the image of the control beam CB taken by the camera 22 (step SB1, FIG. 17E) and then calculates the difference between the images of the before and after irradiation images of the laser beam LB or between the images before and after the predetermined time irradiation during irradiation of the laser beam LB by processing the acquired image (step SB2). The controller 42 processes the workpiece W by adjusting the output of the laser beam LB or adjusting the irradiating time by the on/off the laser beam LB on the basis of the calculated difference (step SB3). When the difference does not vary enough in spite of adjusting the output or the irradiating time of the laser beam LB (step SB4, NO), the controller 42 iterates the processes from step SB1 for adjusting the output or the irradiating time of the laser beam LB. On the other hand, when the output of the laser beam LB varies enough (step SB4, YES), the beam control process ends.

If there is a next process (step S16), the controller 42 iterates the processes from step S11. On the other hand, if there is no process (step S16, NO), the controller 42 processes ending process (step S17) and all processes are ended.

Although certain preferred embodiments of the beam processor according to the present invention have been shown and described in detail, it should be understood that various changes and modifications may be made to the embodiments without departing from the scope of the invention as set forth in the appended claims.

For example, the laser beam processors 10, 50, 60, and 90 radiate the laser beam LB onto the workpiece W from the upper vertical direction to the lower direction as described above, but it should not be limited to this direction. The present invention can include the processor which irradiates the laser beam LB to the workpiece W from the lower direction to the upper direction or from the side to the side.

The beam for processing the workpiece W can employ any beam including, for example, an electron beam or an electromagnetic wave.

The control beam detecting means which detects the control beam CB reflected by the workpiece W can use a photoelectric converter, a photodetector, a cymoscope, such as a CCD camera, and a photomultiplier. Here, as long as the light can irradiate the work surface of the workpiece W and the image can be acquired, the workpiece W may be irradiated with illumination light other than the control beam CB.

The laser beam LB output from the laser oscillator 32 can be modulated to form the desired processing pattern on the work surface of the workpiece W by incorporating an optical modulator such as a liquid crystal mask or a digital mirror device (DLP) in the beam moving unit 12 and controlling this optical modulator according to the image information.

For example, in FIG. 5A, the laser beam processor 10 has six flat reflectors 14 each in the right and the left, totaling twelve flat reflectors 14. This number of the flat reflectors 14 is the best number when the optical path length is from 300 mm to 400 mm, the beam diameter of the laser beam LB on the flat reflector 14 is not less than 10 mm and the error of the optical path length is less than or equal to 1 mm. Therefore, if conditions differ, the number of the flat reflectors 14 can be selected in any number of sheets.

The beam moving unit 12 can employ, for example, an ultrasonic motor which has high stopping accuracy instead of the galvanometer motors 30X, 30Y.

The beam moving means for moving the laser beam LB can employ, for example, a polygon mirror instead of the galvanometer mirrors 28X, 28Y.

The beam moving means should not be limited to a beam moving means that moves the laser beam LB in the directions of two dimensions but may move the laser beam LB in the directions of only one dimension.

The beam processor of the present invention can provide the high efficiency cream soldering system on the mounting line instead of the processing process by the manual soldering or the soldering robot in which a number of LED electrodes with many running-out pins are processed.

The beam processor of the present invention can perform processing in a wide range without processing in each narrow range of the prior art. Therefore, this processor is suitable for, for example, a process such as a boring process, a soldering process, a sealing process, and a detecting process to the substrate of a solar cell, a sheet not less than 300 mm width or a panel.

The beam processor of the present invention is suitable for a process such as a detecting process or a processing process of a container or a film which has a wide area with liquid thereon, a cultivation plate or immersion substance by decreasing the movement distance or stopping the movement of the stage. This processor is suitable for the high speed processing of many positions of human bodies, animals or plants which are fixed and difficult to move to any position.

The beam processor of the present invention can perform a boring process, a welding process, a cutting process, or a soldering process at high speed in the circuit processing of flexible sheets, or the like as rolled sheets without cutting.

The beam processor of the present invention is located above or in a gas or liquid flow and is suitable for the measurement or the processing of objects which pass through the flow. For example, this machine can perform the measurement of the flotsam of the river and measurement of fish.

The beam processor of the present invention can perform beam exposure using the mask plate in a wide area as necessary. Therefore, this processor can form the desired pattern or character into a liquid crystal panel, a solar cell panel, a sheet, a panel, a cloth, foods, a packaging container, and the like.

KEY TO SYMBOLS 10, 50, 60, 90: laser beam processor
12: beam moving unit
14: flat reflector
16: supporting frame
18: laser source
20: LED
22: camera
24: half mirror
26: mirror for camera
26a: aperture
28X, 28Y: galvanometer mirror
30X, 30Y: galvanometer motor
32: laser oscillator
34: beam expander
36: beam diaphragm
38: beam focusing lens
40: irradiation point
42: controller
52a-52e, 62a-62d: distribution mirror
54: Fθ lens
70: small reflector
72: solder
74: chip
76, 80, 82: objective lens
78: protection glass
92: focus position correcting mechanism
94a, 94b, 99: guide rail
96: moving body
98: ball screw
100, 104: gear train
102: wire
110: mask plate
112: mask pattern
118: bright spot
120, 128: copper foil
122, 130: lead
CB: control beam
LB: laser beam
W: workpiece

What is claimed is:

1. A beam processor for processing a work surface of a workpiece by irradiating the work surface with a beam, comprising:
an output source for outputting the beam;
a beam moving means having a mirror for moving the beam output from the output source; and
a plurality of reflectors disposed on an optical path of the beam between the beam moving means and the work surface for reflecting the beam moved by the beam moving means and conducting the beam to the work surface, wherein
the plurality of reflectors is inclined a predetermined angle corresponding to an incident direction of the beam so that the beam moved by the beam moving means is conducted nearly vertically to a different position of the work surface, the plurality of reflectors is disposed at positions where each optical path length from the output source to the work surface via the plurality of reflectors is nearly the same, an effective width Lw of each of the reflectors is determined by an equation using a deflecting angle Ra of the beam relative to a rotating center of the mirror, a distance R from the rotating center to the center of one of the reflectors, an angle La of the beam incident to the center of one of the reflectors based on the work surface, a beam diameter φLB of the beam:

$Lw=2R \cdot \sin((\pi/2+La-Ra)/2) \cdot \sin Ra + \varphi LB$

2. The beam processor according to claim 1, further comprising:
a processing pattern forming means disposed between the plurality of reflectors and the work surface for forming a processing pattern of the beam radiated onto the work surface.

3. The beam processor according to claim 1, further comprising:
a plurality of distribution reflectors disposed between the beam moving means and the plurality of reflectors for reflecting the beam moved by the beam moving means and distributing the beam to the plurality of reflectors.

4. The beam processor according to claim 1, further comprising:
an objective lens disposed between the plurality of reflectors and the work surface.

5. The beam processor according to claim 4, further comprising:
a lens moving means for moving the objective lens along the work surface; and
a position control means for controlling the lens moving means and controlling a position of a focal point of the beam on the work surface.

6. The beam processor according to claim 1, further comprising:
a control beam radiating means for radiating the work surface with a control beam with the same axis as the beam;
a control beam detecting means for detecting the control beam reflected by the work surface; and
a beam control means for controlling at least one of a radiation position of the beam on the work surface and an output of the beam on the basis of the control beam detected by the control beam detecting means.

7. The beam processor according to claim 1, further comprising:
a camera for taking an image of the work surface; and
a beam control means for controlling a radiation position of the beam on the work surface on the basis of the image taken by the camera.

* * * * *